July 20, 1937.   G. MUFFLY   2,087,354
SPRING
Filed April 14, 1936
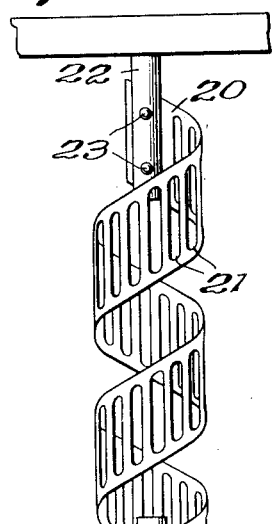
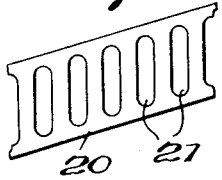
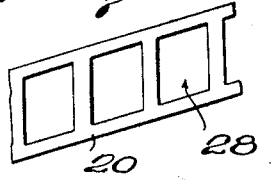
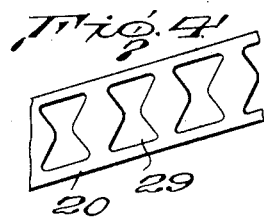
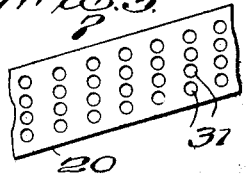
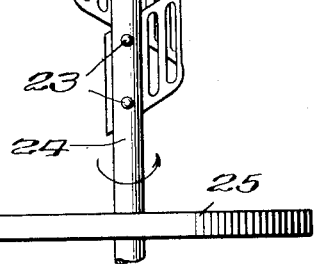
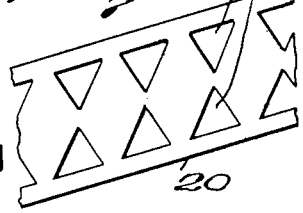
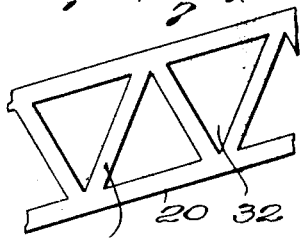
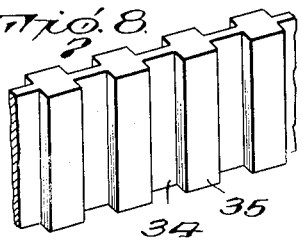
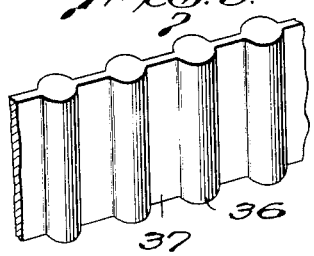
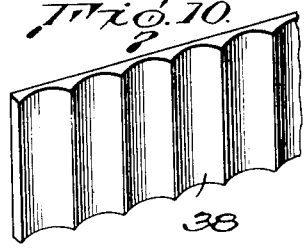
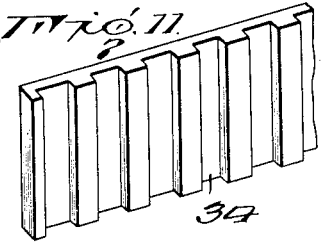
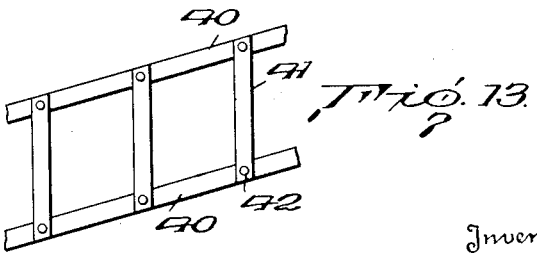
Inventor
Gary Muffly,
By G. M. Houghton
his Attorney Patented July 20, 1937

2,087,354

UNITED STATES PATENT OFFICE 2,087,354

SPRING

Gary Muffly, Oakmont, Pa., assignor to Gulf Research & Development Company, Pittsburgh, Pa., a corporation of Delaware Application April 14, 1936, Serial No. 74,356

5 Claims. (Cl. 267—1)

This invention relates to springs; and it comprises a coiled spring comprising a thin band wound into spiral shape, the band having spaced laterally-flexible portions along its length with stiff reinforcing portions between the flexible portions, and having continuous edges, so that the spring gives a high angular deflection upon axial stress; all as more fully hereinafter set forth and as claimed.

One object of the invention is to provide a helical spring which affords a high angular deflection or twist, under loading in the direction of the axis of the helix.

Another object is to provide a helical spring made of a coiled ribbon, the ribbon being modified so as to increase its lateral flexibility while preserving its axial rigidity.

Another object is to provide a spring suitable for use in apparatus measuring very small force changes, and adapted to give a high angular deflection when subjected to such force changes.

There has recently been developed a gravimeter, that is a device for measuring the force of gravity on the earth's surface, which comprises a freely hanging mass suspended from a fixed support by means of a ribbon helix spring, that is to say a coil spring made by winding up a thin flat ribbon or tape into a helix. Upon setting up the apparatus in a given locality the mass and the spring remain in a certain definite fixed position, determined by the force of gravity at the spot. Upon moving the apparatus to a locality in which the force of gravity is different, the weight of the mass changes. This stresses or stretches the spring and causes an angular deflection of the unfixed end of the spring; the helical spring having the remarkable property of twisting substantially under axial loading, without much elongation.

The present invention relates to an improved type of spring which is particularly well adapted for use in such type of gravimeter, but which also has wide applicability in all other cases where it is desired to measure and indicate force changes as an angular deflection.

The stated objects are achieved by providing a helical spring made up of a coiled band, the band being modified to enhance its lateral flexibility.

Examples of specific embodiments of my invention are shown in the accompanying drawing, in which Fig. 1 shows a slotted ribbon helix spring embodied in a gravimeter, and Figs. 2 to 13 show springs modified in various ways to enhance the torsional flexibility.

Referring to the drawing, Fig. 1 shows the invention as embodied in a gravimeter. There is provided a helical spring composed of a thin band or ribbon 20 of metal or other resilient material, provided along its length with spaced slots 21 the major axes of which are parallel to the axis of the helix. The spring is attached at its upper end to a fixed support 22 as by rivets 23. At the lower end is attached a post 24 carrying an annular mass 25. The lower end of the spring and weight assume a certain definite position corresponding to the force of gravity at the place where the gravimeter is set up. Upon moving the instrument to a location of greater or less gravity, the weight of annulus 25 changes to a minute degree. This stresses the spring, which unwinds through a definite angle in the direction of the arrow upon increase in gravity, and winds in the reverse direction upon decrease in gravity. The deflection is measured by suitable indicating means, not shown. Angular deflection is afforded by a simple helical spring arranged similarly; but the deflection of my spring is much greater. This is because the torsional flexibility is enhanced while the vertical rigidity is but little changed. When it is considered that the changes to be measured in gravimetry are often only 1 part in 10,000,000 or so, the advantages of my spring, which gives an angular deflection several times that of a flat ribbon spring, are manifest.

In all cases the ribbon is much thinner than it is wide, so as to get as high angular deflection sensitivity as possible. The thickness usually ranges from 1/10 to 1/600 of the width.

Fig. 2 shows a portion (about half a turn) of the spring of Fig. 1 as laid out flat; that is, the figure shows a portion of the ribbon from which the coil spring is made. It will be noted that the slots are parallel to the vertical axis, and thus are not at right angles to the axis of the ribbon. This arrangement is most advantageous, as the torsional flexibility and the vertical rigidity are both maximum. However, the slots need not be strictly parallel to the helix axis; they can be disposed at right angles to the ribbon axis, if desired, without much loss in efficiency.

Fig. 3 shows a ribbon provided with slots so broadened as to form squares (approximately) as indicated at 28. This arrangement gives very high torsional flexibility with not much loss in vertical rigidity.

Fig. 4 shows a modification having hour-glass shaped slots 29. This type has properties intermediate those of Figs. 2 and 3. Fig. 6 shows the arrangement of Fig. 4 carried a little further, so that a double row of triangular slots 30 is formed.

Fig. 5 shows a modification of Fig. 2 in which the slots are replaced by spaced series of holes 31. This modification has slightly less torsional flexibility and slightly greater vertical rigidity than the Fig. 2 spring.

Fig. 7 shows a modification wherein the slots are shaped as triangles 32, so spaced as to leave strut-like portions 33. This arrangement has almost as high torsional flexibility as Fig. 3 and a substantially higher vertical rigidity.

Figs. 8–11 show modifications wherein enhanced torsional flexibility is secured by lessening the thickness of the ribbon at intervals along its length by provision of grooves rather than by making holes clear through as in Figs. 1–7. In Figs. 8–11 the thickness of the ribbon is exaggerated for the sake of clarity of showing. In Fig. 8 the ribbon is provided with parallel rectangular grooves 34, depressed below the surface leaving thicker, post-like portions 35. The spring of Fig. 9 is similar, but has rounded post-like portions 36, with intermediate depressions 37 and thus is well adapted to be made by rolling a flat strip. Fig. 10 shows a modification particularly well adapted to be made by rolling operations, having concave grooves 38 as shown. The device of Fig. 11 is similar to that of Fig. 8, but has grooves 34 on only one side.

In Figs. 8–11 the depth of the grooves is determined in accordance with the average stress to which the spring is to be subjected. If the spring is required to resist a heavy force, the grooves are made shallow. If the spring is to be but lightly loaded, the grooves can be deepened with consequent gain in angular sensitivity.

Fig. 12 shows a modification which is very easily made. The ribbon is provided with corrugations 39 which act somewhat like hinges, making the ribbon considerably more flexible in the lateral direction without diminishing the vertical rigidity to anything like the same extent.

In some cases, particularly in large scale apparatus, it is convenient to make up the springs out of separate elements rather than to form them in one piece. Fig. 13 shows one such spring, comprising two spaced bands 40 having spaced struts 41 rigidly attached to each band as by rivets 42, providing an arrangement analogous to that of Fig. 3.

My springs can be made in various ways. Those in which material is removed from a plain ribbon can be made by cutting, grinding, punching, acid etching, sand blasting or other known mechanical methods. Such forms as that of Fig. 13 can be constructed by welding, soldering, riveting, etc.

While the spring shown in Fig. 1 is a true helix, that is of cylindrical form with coils of constant pitch, the advantages of the invention are secured when the spring is made to have varying pitch, or departs from cylindrical form, or takes the form of a plane spiral rather than a three-dimensional spiral.

The spring can be of any length required and can of course be mounted horizontally or otherwise as required in the particular apparatus with which it is used.

The springs are ordinarily made of steel of characteristics similar to those of clock spring steel.

What I claim is:—

1. In measuring apparatus, a coil spring in the form of a helically wound thin ribbon, the ribbon having spaced laterally-flexible portions along its length with stiff reinforcing portions between the flexible portions, whereby to secure high angular deflection upon axial stress, the edges of the ribbon being continuous whereby to provide rigidity along the direction of the helix axis.

2. In measuring apparatus, a coil spring adapted to give a high angular deflection upon axial loading, comprising a band wound in helical shape with the coils free from frictional contact with each other, the band having grooves spaced along it in the direction of its length and providing portions of high lateral flexibility.

3. In measuring apparatus, a coil spring adapted to give a high angular deflection upon axial loading, comprising a band wound in helical shape with the coils free from frictional contact with each other, the band having a plurality of spaced grooves extending substantially transversely of the band and providing portions of high lateral flexibility.

4. A coil spring for measuring instruments adapted to give a high angular deflection upon axial loading, comprising a thin wound-up band having a plurality of transverse slots therein spaced along the band's length and terminating short of the edges of the band and arranged to increase the lateral flexibility.

5. In measuring apparatus having means for suspending a helical coil spring and means for producing an axial stress on the spring, an improved coil spring in the form of a ribbon wound in a helix in such manner that the coils of the helix are free from frictional contact with each other, the ribbon having spaced laterally-flexible portions along its length with stiff reinforcing portions between the flexible portions, whereby to secure high angular deflection upon application of said axial stress, the edges of the ribbon being continuous so as to provide rigidity along the direction of the helix axis.

GARY MUFFLY.